April 27, 1943.   C. L. THOMAS   2,317,494
REACTIVATION OF SPENT CATALYSTS
Filed Sept. 9, 1940
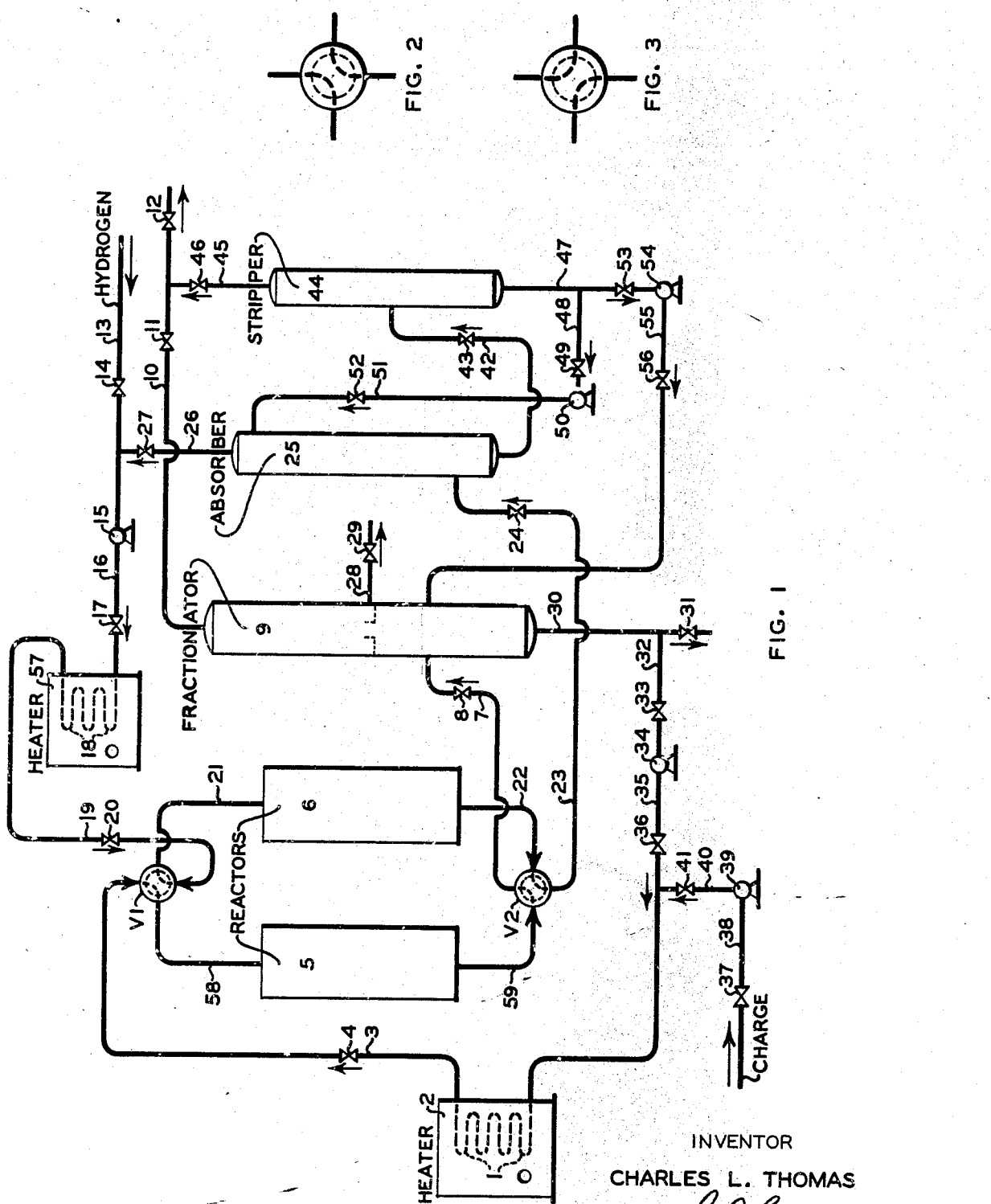
INVENTOR
CHARLES L. THOMAS
BY Lee J. Gary
ATTORNEY Patented Apr. 27, 1943

2,317,494

UNITED STATES PATENT OFFICE 2,317,494

REACTIVATION OF SPENT CATALYSTS

Charles L. Thomas, Chicago, Ill., assignor to Universal Oil Products Company, Chicago, Ill., a corporation of Delaware Application September 9, 1940, Serial No. 355,934

3 Claims. (Cl. 196—52)

This invention relates to the reactivation of catalysts used in the conversion of petroleum hydrocarbons. More specifically, it is concerned with a process for reactivating silica-alumina type catalysts used in the catalytic cracking of petroleum hydrocarbons within the approximate temperature limits of 500–900° F.

The catalysts used in the process with which this invention is concerned are prepared by calcining an alkali metal-free composite of precipitated silica hydrogel and a minor amount of a hydrogel selected from the group consisting of the hydrogels of alumina and zirconia. In the following specifications, the terms "silica-alumina," "silica-zirconia," and "silica-alumina-zirconia" masses are used in a broad sense. No attempt will be made to give the structure of these particular solid substances except to say that they contain silicon, oxygen, aluminum and/or zirconium. To accomplish the purpose of this invention, the known cracking catalysts mentioned are incorporated with a certain amount of a hydrogenating catalyst, such as oxides and/or sulfides of molybdenum, tungsten, chromium, tin, vanadium, etc., alone or together in various combinations. These oxides show relatively low catalytic activity individually but in aggregates display high activity.

The above mentioned catalysts when used in the cracking of petroleum hydrocarbons become coated with carbonaceous materials which decrease the catalytic activity and eventually render the catalyst practically inert. One method of reactivating the used catalysts is to oxidize the carbonaceous deposits with air or preferably an oxygen-containing gas containing smaller percentages of oxygen than are present in ordinary air. This burning consumes appreciable amounts of hydrocarbons that might otherwise be usable. This statement is particularly true when catalytic cracking is conducted at a catalyst temperature within the approximate range of 500-900° F. As the temperature at which the catalytic cracking is conducted increases, the percentage of hydrogen in the carbonaceous deposits decreases and the percentage of carbon increases. For example, if the catalytic cracking is conducted at a temperature of 1025° F., the catalyst will contain less hydrogen and more carbon than if the catalytic cracking is conducted at 800° F. I have found that when the catalytic cracking is conducted at temperatures within the approximate range of 500–900° F. that hydrogen instead of oxygen may be used in reactivating the spent catalyst. The use of hydrogen has the advantage that valuable products are recovered in the regeneration step. Another advantage in the use of hydrogen in the regeneration of spent catalyst is that less heat is generated than in the oxidation method of regeneration. The problem of heat removal in the regeneration of the spent catalyst is a serious one as it is not permissible to allow the temperatures to rise an undue amount in the regeneration process as the activity of the catalyst is destroyed by excessive temperatures. In some cases it may be desired to give the catalyst an occasional air oxidation to remove minor accumulative amounts of unhydrogenated deposits.

In one specific embodiment my invention comprises a process for the reactivation of silica-alumina type catalysts contaminated with carbonaceous material formed by the catalytic cracking of petroleum hydrocarbons within a temperature range of 500–900° F. comprising subjecting said contaminated catalyst to the action of hydrogen under conditions suitable to react said hydrogen with the aforesaid carbonaceous material to form volatile hydrogenated products.

Fig. 1 in the accompanying drawing illustrates diagrammatically in side elevation one specific form of the apparatus which may be employed embodying the broad features of the invention.

Figs. 2 and 3 are detailed two-way inlet and outlet valves diagrammatically illustrated in Fig. 1, Fig. 2 showing the valve in one position and Fig. 3 showing the passageway therethrough shifted.

Referring now to the drawing, a combined feed formed as hereinafter described is introduced to heating coil 1 so disposed as to receive heat from furnace 2. The products leave the heating coil at a temperature within the approximate range of 500–900° F. at pressure ranging from atmospheric to approximately 500 pounds per square inch. The heated products leave coil 1 by way of line 3 controlled by valve 4 from which they pass through valve V₁. After passing through valve V₁, the heated hydrocarbons are directed by way of line 4 to reactor 5 wherein they are subjected to a silica-alumina type cracking catalyst containing a minor amount of hydrogenating catalyst. The silica-alumina type catalysts as used here are catalysts of the type previously mentioned, that is, silica-alumina, silica-zirconia, silica-alumina-zirconia.

In the particular case here illustrated, two reactors, 5 and 6 are employed. Each reactor may contain a plurality of tubes containing the catalytic material. Each reactor may be equipped with a means for introducing a fluid heating or cooling medium around the tubes for the purpose of supplying to, or removing heat from, the reaction zone. It is not intended that the invention should be limited in this respect as adiabatic reactors may be used. In such cases the catalyst is supported in a bed or in a series of beds or trays in an insulated chamber. The heat absorbed in the conversion process and the heat liberated in the regeneration step are taken from the hydrocarbon reactants or given up to the regenerating gases, respectively. When employing two reactors, one is at all times employed as a cracking zone while the catalyst in the other reactor is being reactivated by a stream of hydrogen. The reactors are alternately operated with respect to service for which they are employed by means of valves $V_1$ and $V_2$ through which the reactants and the reactivating gases are supplied and withdrawn.

Any suitable valve arrangement capable of switching the direction of flow of the stream of reactants and the stream of regenerating gases may be employed within the scope of the invention and for the sake of simplifying the description and illustrating the process without unnecessary complications, each of the switching valves is here illustrated as a single four-way valve in which the position of the two passageways therethrough may be shifted as illustrated in Figs. 2 and 3. Assuming that the valve $V_1$ is adjusted to the position illustrated in Fig. 2, the hydrocarbon vapors in line 3 pass through valve $V_1$ into line 4 from which they are supplied to reactor 5 containing the catalytic material in the form of granules. The temperature employed in the catalytic zone during the conversion step lies preferably between the approximate limits of 500–900° F., while employing pressure of the order of atmospheric to 500 pounds per square inch. The extent of cracking per pass is of the order of 10–30%, although the process described here is not limited to such a range. The catalytic hydrocarbon conversion products leave reactor 5 by way of line 59 from which they pass through valve $V_2$ to enter line 7. The hydrocarbon conversion products enter line 7, pass through control valve 8 from which they are supplied to fractionating column 9. Fractionating column 9 operates to separate normally gaseous products, gasoline, and a higher boiling fraction. The normally gaseous products separated in fractionator 9 are removed by way of line 10 controlled by valve 11 and are removed from the system by way of valve 12.

Simultaneously with the conversion of the hydrocarbons in reactor 5, the catalyst in reactor 6 is undergoing reactivation. The hydrogen needed for this purpose is supplied to the system by way of line 13 controlled by valve 14. After passing through valve 14, hydrogen supplied to the system is commingled with the hydrogen recycle fraction as shown in the diagram. This mixture of recycle hydrogen and extraneous hydrogen enters compressor 15 which discharges into line 16 controlled by valve 17. After passing through valve 17, the hydrogen under pressure is supplied to heating coil 18 so disposed as to receive heat from furnace 57. In heating coil 18, hydrogen is heated to a temperature within the approximate range of 500–900° F., under a pressure varying from approximately 50–2000 pounds per square inch. The heated hydrogen is supplied to line 19 controlled by valve 20 from which it passes through valve $V_1$ to line 21 supplying reaction zone 6. The heated hydrogen under high pressure hydrogenates the carbonaceous deposits to form volatile hydrocarbons which are removed from reaction zone 6 by way of line 22 from which they pass through valve $V_2$ to enter line 23 controlled by valve 24. The mixture of hydrogen and hydrocarbons leaving the reactor after undergoing regeneration is supplied by way of line 23 to absorbing column 25 wherein the hydrocarbons are separated from unreacted hydrogen. The unreacted hydrogen leaves absorption column 25 by way of line 26, controlled by valve 27 from which it is discharged into line 13 to be commingled with the extraneous hydrogen introduced to the system.

Gasoline formed in the process is separated from fractionating column 9 by way of line 28 controlled by valve 29 and is collected as a product of the process. Higher boiling hydrocarbons are removed from fractionating column 9 by way of line 30, and if desired, a portion may be removed from the system by way of valve 31. The remaining portion, or all, of these higher boiling hydrocarbons are directed from line 30 to line 32 controlled by valve 33 and supplied to pump 34 which discharges into line 35 controlled by valve 36. This recycle is then commingled with the raw oil charging stock which is preferably, but not necessarily, a distillate and is introduced to the system by way of line 38 controlled by valve 37 and enters pump 39 which discharges into line 40 controlled by valve 41. After passing through valve 41, this charge is commingled with the recycle material introduced through line 35 as hereinbefore set forth to form the combined feed for the process.

The rich absorption liquid is removed from column 25 by way of line 42 and after passing through valve 43 is supplied to a stripping column 44. This column is equipped with a reboiler (not shown) and operates in the normal manner to remove the dissolved hydrocarbons from the enriched absorbing oil. These gaseous hydrocarbons leave stripping column 44 by way of line 45 controlled by valve 46 and are removed from the system by way of line 10 controlled by valve 12. The lean absorption oil leaves stripping column 44 by way of line 47 and returned to the absorption column by passing through line 48 controlled by valve 49 from which it enters pump 50 discharging into line 51 controlled by valve 52. Line 51 supplies the lean absorption oil to the top of absorption column 25 for re-use. The excess quantity of lean absorption oil line in 47 passes through valve 53 and enters pump 54 which discharges into line 55 controlled by valve 56. This excess lean absorption oil is supplied to fractionating column 9. The operation of fractionating column 9 has already been described.

The following example shows the type of results obtainable by the use of the process comprising my invention. A silica-alumina-zirconia composite containing the components in the ratio of 100 mols of silica to 2 mols of alumina and 4 mols of zirconia which had been impregnated so that they contained 0.5 weight per cent of molybdic oxide is used in form of 3 mm. pellets in the cracking of a Mid-Continent gas oil. This gas oil is passed over the catalyst at a temperature of 800° F., 100 pounds per square inch gauge and an hourly liquid space velocity of 1 volume per volume of catalyst. The gasoline obtained is equal to 39 volume per cent of 400° F. end point gasoline having a bromine number of 15.

After passing the charge over the catalyst for a period of one hour, hydrogen gas heated to a temperature of 850° F. and a pressure of 1000 pounds per square inch is passed over the catalyst for a period of one hour. After regeneration with hydrogen, the gas oil charging stock is again passed over the catalyst for a period of one hour using the same space velocity, temperature, and pressure as before. The amount of 400° F. end point gasoline obtained in the second step was equal to 38.8 volume per cent having a bromine number of 15½ showing that the catalyst has been regenerated by the use of the hydrogen gas.

I claim as my invention:

1. A process which comprises subjecting hydrocarbons to conversion in a reaction zone in the presence of a cracking catalyst containing a minor proportion of a hydrogenating catalytic component, maintaining the reaction temperature during said conversion in the approximate range of 500–900° F., thereby depositing on the catalyst hydrocarbonaceous matter capable of being hydrogenated with resultant formation of more valuable hydrocarbons, thereafter passing a hydrogen-containing gas through the reaction zone and therein subjecting the catalyst containing said hydrocarbonaceous matter to hydrogenation to form said more valuable hydrocarbons and to regenerate the catalyst, and separating said more valuable hydrocarbons from the effluent of the hydrogenation step.

2. A process which comprises subjecting hydrocarbon oil to conversion in a reaction zone in the presence of a cracking catalyst comprising silica and alumina and containing a minor proportion of a hydrogenating catalytic component, maintaining the reaction temperature during said conversion in the approximate range of 500–900° F., thereby depositing on the catalyst hydrocarbonaceous matter capable of being hydrogenated with resultant formation of more valuable hydrocarbons, thereafter passing a hydrogen-containing gas through the reaction zone and therein subjecting the catalyst containing said hydrocarbonaceous matter to hydrogenation to form said more valuable hydrocarbons and to regenerate the catalyst, and separating said more valuable hydrocarbons from the effluent of the hydrogenation step.

3. A process which comprises subjecting hydrocarbon oil to conversion in a reaction zone in the presence of a cracking catalyst comprising silica and zirconia and containing a minor proportion of a hydrogenating catalytic component, maintaining the reaction temperature during said conversion in the approximate range of 500–900° F., thereby depositing on the catalyst hydrocarbonaceous matter capable of being hydrogenated with resultant formation of more valuable hydrocarbons, thereafter passing a hydrogen-containing gas through the reaction zone and therein subjecting the catalyst containing said hydrocarbonaceous matter to hydrogenation to form said more valuable hydrocarbons and to regenerate the catalyst, and separating said more valuable hydrocarbons from the effluent of the hydrogenation step.

CHARLES L. THOMAS.